United States Patent [19]

Maxwell

[11] Patent Number: 5,494,257
[45] Date of Patent: Feb. 27, 1996

[54] DAMPER VALVE HAVING AN ADJUSTABLE SEAT

[75] Inventor: Ronald K. Maxwell, Irving, Tex.

[73] Assignee: Precision Engineered Products, Inc., Arlington, Tex.

[21] Appl. No.: 475,082

[22] Filed: Jun. 7, 1995

Related U.S. Application Data

[63] Continuation of Ser. No. 317,651, Sep. 30, 1994, abandoned.

[51] Int. Cl.⁶ .................................................. F16K 1/228
[52] U.S. Cl. ........................................ 251/307; 251/306
[58] Field of Search .................................. 251/307, 305, 251/306, 316

[56] References Cited

U.S. PATENT DOCUMENTS

| | | |
|---|---|---|
| 2,083,154 | 6/1937 | Kinzie et al. ............................. 251/307 |
| 3,144,040 | 8/1964 | White . |
| 3,197,174 | 7/1965 | Killian . |
| 3,393,697 | 7/1968 | Fawkes . |
| 3,554,216 | 1/1971 | Piguet ................................... 251/307 X |
| 3,814,380 | 6/1974 | Kormos et al. . |
| 4,006,883 | 2/1977 | Hillsheimer . |
| 4,220,314 | 9/1980 | Lynch . |
| 4,398,696 | 8/1983 | Szilagyi et al. . |
| 4,582,080 | 4/1986 | Stock . |
| 5,327,928 | 7/1994 | Thomason ............................ 251/307 X |

Primary Examiner—John C. Fox
Attorney, Agent, or Firm—Lane, Aitken & McCann

[57] ABSTRACT

A damper valve includes a base, a valve element pivotally mounted on the base and adjustable valve seat portions on opposite sides of a pivot axis, the valve seat portions being positioned on opposite sides of the blade. Each valve seat portion includes a stationary member fixed to the base, an adjustable element movable relative to the stationary member, and bolts fixing the adjustable element to the stationary member. In addition, adjustment devices are provided for moving the adjustable element toward the valve element to provide a precise fit along the entire length of the valve seat.

17 Claims, 3 Drawing Sheets ically 5,494,257

DAMPER VALVE HAVING AN ADJUSTABLE SEAT

This application is a continuation, of application Ser. No. 08/317,651, filed on Sep. 30, 1994.

BACKGROUND OF THE INVENTION

The present invention relates to valves having adjustable seats and, more particularly, to damper valves having seats which are variably adjustable.

Damper valves of the butterfly type are known in which a blade, usually of circular shape, is mounted for pivoting between an open position and a closed position to control the flow of fluid through the valve. A shaft about which the blade pivots is positioned diametrically with respect to the blade and is mounted for pivoting in bearings beyond the periphery of the blade. A curved blade seat is positioned in a valve body for side, that is, axial, engagement with one of the faces of the blade along the periphery of the blade.

The blade, the seat and the body can all be made of stainless steel and can be fabricated with precision. However, during handling, shipment and installation of the valves, the body can deform slightly, especially since the valves are large, typically having a diameter of several feet. Even a slight distortion, for example, on the order of less than 0.0001 inch, can have an adverse affect on the sealing ability of the valve.

SUMMARY OF THE INVENTION

By the present invention, the problem of loss of precise seating due to deformation of the body or other parts of the valve has been overcome. More particularly, the present invention relates to a valve in which an arrangement is provided for adjusting the seat along the length thereof to ensure a tight seal despite variations that might take place in the valve during shipping or installation, or at other times. The valve can be used with fluids at relatively high temperatures, for example, 800° F.

The arrangement includes a fixed seat member mounted on an inner surface of a valve body or base and having a side surface positioned for axial engagement with an overlapping portion of a side surface at the perimeter of the valve disk or blade. A portion of the seat on one side of the shaft is positioned on a first side of the blade, and a portion of the seat on the opposite side of the shaft is positioned on the frame for engagement with a second side of the blade. For each portion of the seat, an adjustable seat member is mounted on a surface of the fixed seat member facing the center of the frame, the adjustable seat member being movable axially relative to the fixed seat member, toward the valve blade, so that the adjustable seat member can be moved into engagement with any portion of the valve blade where the fixed seat member does not contact the blade. Bolts are provided at spaced locations along the lengths of the fixed valve seat member to secure the adjustable seat member to the fixed valve seat member when the desired precise positioning of the adjustable valve seat member has been achieved. A plurality of adjustment devices are spaced along the length of the seat and engage the adjustable seat members. Each adjustment device includes a threaded member, such as a bolt, engaging the adjustable seat member to move the adjustable seat member into sealing engagement with the blade at the needed places around the perimeter of the blade.

DETAILED DESCRIPTION OF THE PREFERRED EMBODIMENTS

Figure 1:
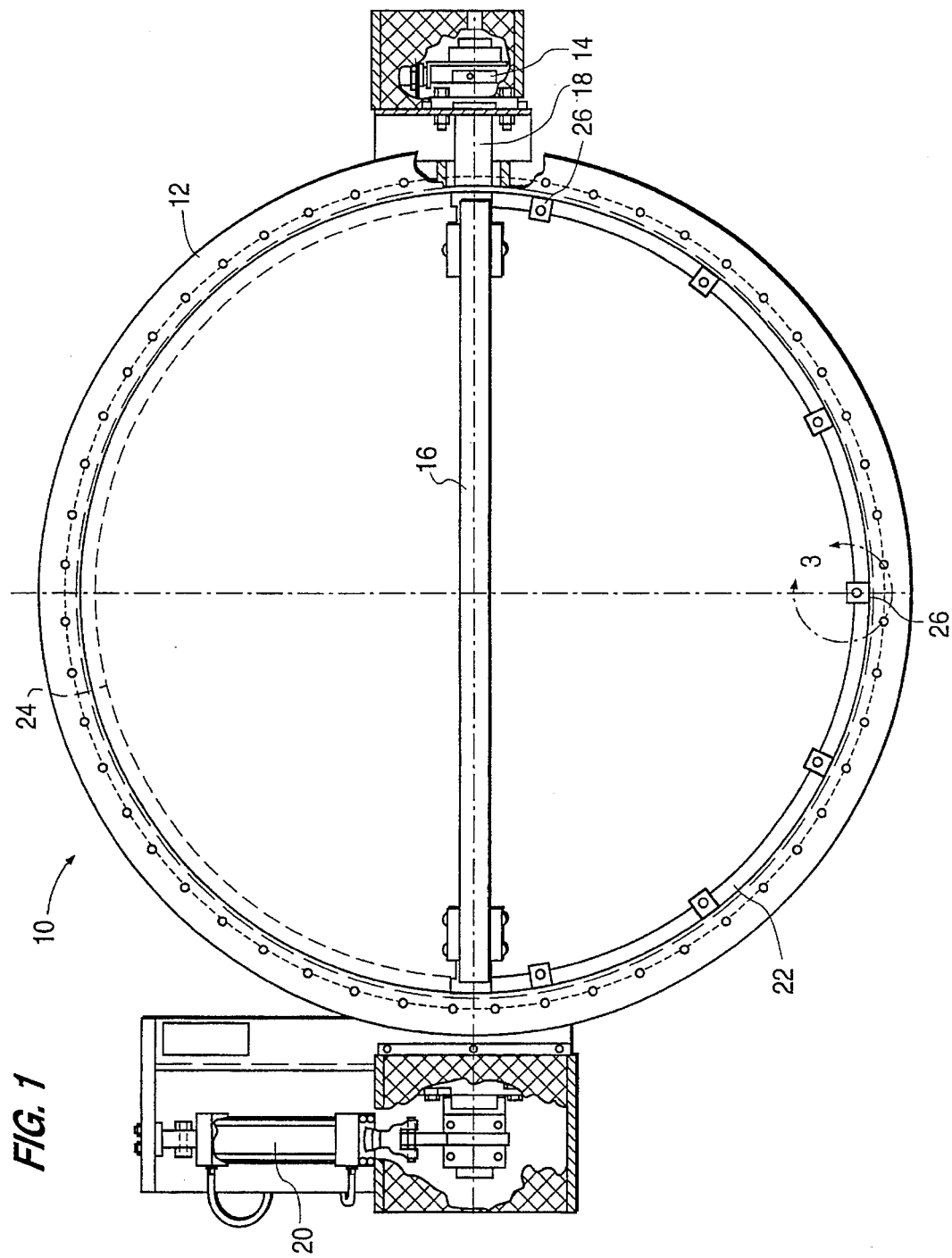
FIG. 1 is a front view of the valve according to the present invention, with the valve blade in an open position.

As can be appreciated from FIG. 1, the damper valve according to the present invention, which is designated generally by the reference numeral 10, includes a body or base 12 and bearings 14, one of which is shown, secured to the base 12. A circular valve element or blade 16 is positioned within the base 12, extending across most of the area of an inner circumference of the valve base. The blade 16 is secured to a shaft 18, which is mounted in the bearings 14 for pivoting movement relative to the base 12. A fluid pressure cylinder 20 is mounted on an exterior side of the base 12 and connected to an end of the shaft 18 for pivoting the shaft and, thereby, moving the valve blade 16 between open and closed positions.

A valve seat includes two portions 22 and 24 both mounted on an interior surface of the base 12, one portion 22 being mounted on one side of the valve blade 16, and the other portion 24 being mounted on the opposite side of the valve blade. Seat adjustment devices 26 are mounted on an inner surface of the base 12 at intervals along the length of the valve seat portions 22 and 24. In FIG. 1, the valve seat portion 24 is shown in phantom and the seat adjustment devices associated with the valve seat portion 24 are not shown.

Figure 2:
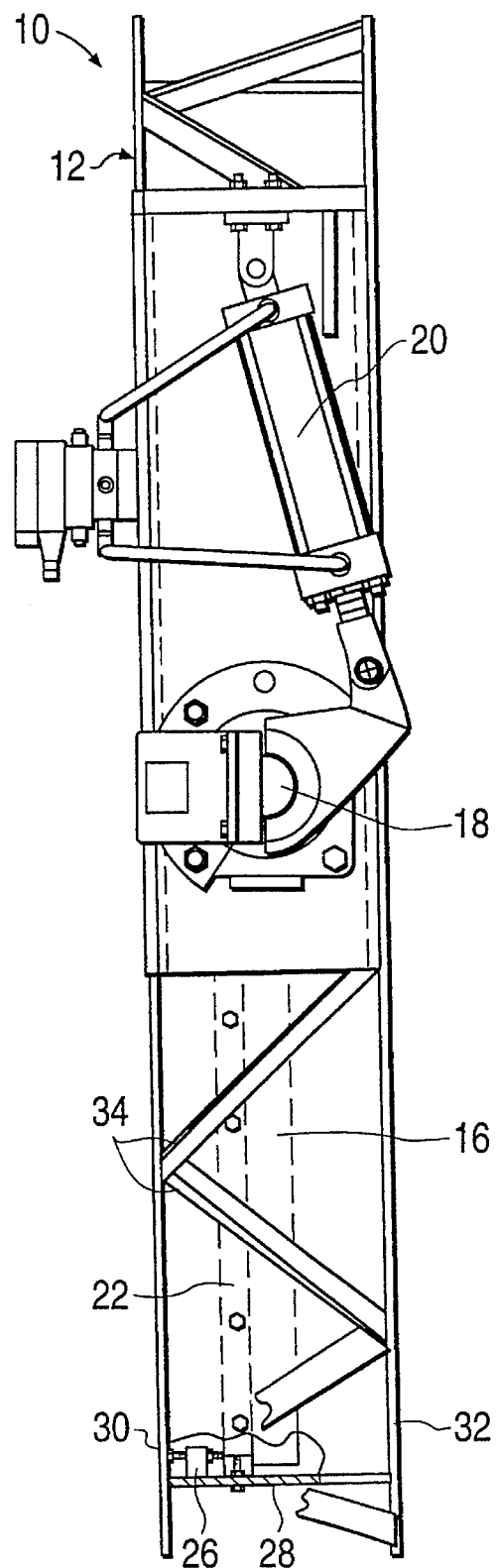
FIG. 2 is a side view of the valve of FIG. 1, but with the valve blade in the closed position.

As can be seen in FIG. 2, the base 12 comprises a frame including a cylinder 28, radially extending flanges 30 and 32 secured at axial ends of the cylinder 28, and struts 34 connected between the flanges 30 and 32.

Figure 3:
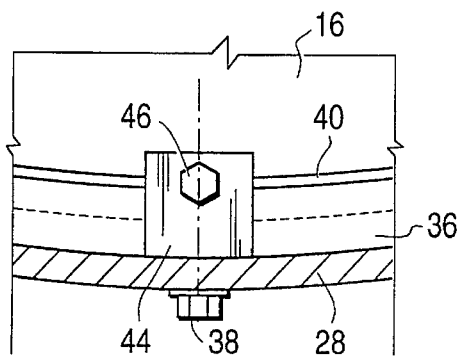
FIG. 3 is an enlargement of the portion of the valve within the circle 3 in FIG. 1, with a flange of the frame removed and the valve blade in the closed position.
Figure 4:
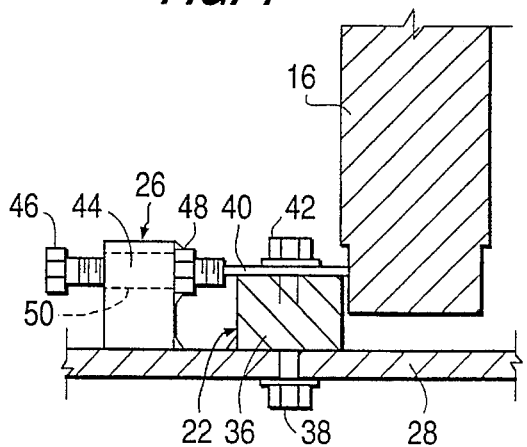
FIG. 4 is a right side view of the adjustment device of FIG. 3.

As can best be seen from FIGS. 3 and 4, the valve seat portion 22 includes a stationary member 36 fixed by a plurality of bolts 38 to the cylinder 28, which is part of the valve base 12. A side of the stationary member 36 facing the blade 16 is machined for a precise fit with a side surface of the outer periphery of the blade, which is also machined. The stationary member 36 has a length parallel to the circumference of the cylinder 28, and the stationary member is curved to conform to the inner circumference of the cylinder. The valve seat portion 22 also includes an adjustable element 40 secured to the circumferentially inner surface of the stationary member 36 and having a width greater than the width of the stationary member. The adjustable element 40 has a radial dimension, or thickness, considerably smaller than that of the stationary member 36 and has a plurality of slots (not shown) extending parallel to the width of the adjustable element. The adjustable element 40 is secured to the stationary element 36 by a plurality of bolts 42, a bolt 42 extending through each of the slots to secure the adjustable element to the stationary member when the desired position of the adjustable element relative to the stationary member has been attained. Typically, the slots have a length of ¾ inch. A side of the adjustable element 40 facing the blade 16 is machined for precise engagement with the side of the blade. A side of the adjustable element 40 facing away from the blade 16 is engaged by the adjustment devices 26. Although the foregoing description has been made in connection with the valve seat portion 22, it is understood that the valve seat portion 24 has the same structure.

Figure 5:
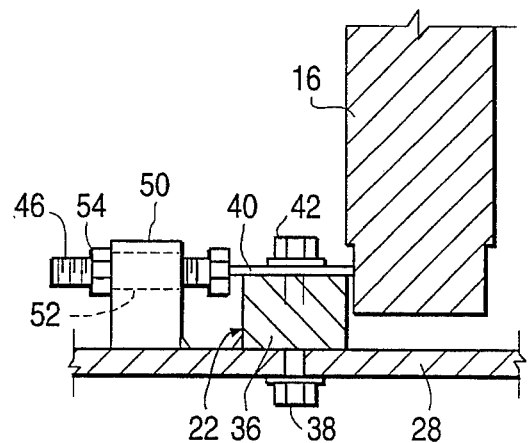
FIG. 5 is a side view of an alternate adjustment device.

Each adjustment device 26 includes a base member 44, a threaded aperture associated with the base member 44 and a threaded element 46 cooperating with the threaded aperture. In the embodiment of FIG. 4, the threaded aperture is contained in a nut 48 welded to a side of the base member 44 facing the blade 16. With this arrangement, the base member 44 has a bore 50 in alignment with the threaded aperture in the nut 48 and large enough that the threaded element can be slid axially through the bore. The threaded element 46 is a bolt whose head is oriented distal to the blade 16. FIG. 5 shows an alternate arrangement in which a bore 52 through a base member 50 is threaded and sized such that its threads cooperate with the threads of the threaded element 46. Thus, in FIG. 5 the bore 52 is the threaded aperture associated with the base member 44. The threaded element 46 is oriented with its head proximal to the blade 16, and a jam nut 54 cooperates with the end of the threaded element 46 distal to the blade 16 to prevent rotation of the threaded element 46 relative to the base member 44 when the desired position of the threaded element has been attained. As yet another alternative (not shown), the threaded element 46 is oriented as shown in FIG. 5 and a jam nut 54 is used, but the base member has a bore, like the bore 50 of FIG. 4, which is large enough that the threaded element can be slid axially through the bore, and a nut 48 is welded to a side of the base member facing the blade 16. For each of the adjustment device arrangements, the base member can be an angle section having a first leg extending perpendicularly to the cylinder 28 and containing the bore to receive the threaded element, in the manner of the base members 44 and 50 of FIGS. 4 and 5, respectively. The other leg of the angle section extends along the cylinder 28 in a direction away from the valve seat portion 22 and perpendicular to the first leg of the angle section.

During manufacture, the valve seat portions 22 and 24 are precisely fixed in place using the bolts 38 to provide precise engagement between the facing machined faces of the stationary members 36 and the blade 16. When the damper valve 10 has been installed, the fit between the valve seat portions 22 and 24 and the blade 16 are checked along the entire length of the valve seat portions. If any gaps are detected, the bolts 42 are slightly loosened and the threaded element 46 turned to move the adjustable member 40 into engagement with the face of the blade 16 where there had been a gap. This is done on the adjustment device or devices 26 lying closest to the gaps. When precise engagement is provided, the bolts 42 are tightened and, where a jam nut is used, the jamb nut is also tightened to lock the adjustable member 40 in position. This procedure is followed for all gaps along the lengths of the valve seat portions 22 and 24.

Having thus described the present invention and its preferred embodiments in detail, it will be readily apparent to those skilled in the art that further modifications to the invention may be made without departing from the spirit and scope of the invention as presently claimed.

I claim:

1. A damper valve for controlling the flow of fluids through a conduit, comprising:

a base;

a valve element having opposed side surfaces, a periphery, and a central plane extending through the periphery;

an adjustable valve seat including a stationary member mounted on said base and an adjustable element mounted for movement relative to said stationary member, said adjustable element having a side facing said valve element and a side facing away from said valve element;

means for mounting said valve element for pivoting movement relative to said base into a closed position in which a portion of at least one of said opposed side surfaces of said valve element is in sealing engagement with said valve seat; and means for adjusting said adjustable element in a direction generally perpendicular to said central plane, when said valve element is in the closed position, by engaging the side of the adjustable element facing away from said valve element, wherein the adjusting means comprises means for moving said adjustable element in a direction generally perpendicular to said portion of the surface with which said valve seat is in sealing engagement.

2. The damper valve of claim 1, wherein said adjustable valve seat has a length parallel to said at least one of said opposed side surfaces when said valve element is in the closed position, and said adjusting means comprises a plurality of adjusting devices spaced from one another in a direction parallel to the length of said adjustable valve seat.

3. The damper valve of claim 2, wherein each said adjusting device comprises a base member, a threaded aperture associated with said base member, and a threaded element cooperating with said threaded aperture, said threaded element being engageable with said side of said valve seat facing away from said valve element.

4. The damper valve of claim 3, further comprising means for locking each said threaded element in a desired position.

5. The damper valve of claim 2, wherein said adjustment devices are independently adjustable.

6. The damper valve of claim 1, wherein said adjusting means comprises a base member, a threaded aperture associated with said base member, and a threaded element cooperating with said threaded aperture, said threaded element being engageable with said side of said valve seat facing away from said valve element.

7. The damper valve of claim 6, further comprising means for locking said threaded element in a desired position.

8. The damper valve of claim 1, wherein said valve seat further comprises means for fixing said adjustable element to said stationary member in a desired position.

9. A damper valve for controlling the flow of fluids through a conduit, comprising:

a base defining a flowpath through the conduit;

a valve element having opposed side surfaces, a periphery, and a central plane extending through the periphery;

an adjustable valve seat including a stationary member mounted on said base and an adjustable element mounted for movement relative to said stationary member, said adjustable element having a side facing said valve element and a side facing away from said valve element;

means for mounting said valve element for pivoting movement relative to said base into a closed position in which a portion of at least one of said opposed side surfaces of said valve element is in sealing engagement with said valve seat; and means for adjusting said adjustable element in a direction generally perpendicular to said central plane, when said valve element is in the closed position, by engaging the side of the adjustable element facing away from said valve element, wherein said side of said adjustable element facing away from said valve element lies within said flowpath.

10. A damper valve for controlling the flow of fluids through a conduit comprising:

a base;

a valve element having surfaces for engagement with a valve seat, a periphery, and a central plane extending through the periphery;

an adjustable valve seat mounted on said base, said adjustable valve seat including a stationary member mounted on said base and all adjustable element mounted for movement relative to said stationary member;

means for mounting said valve element on said base for pivoting movement into a closed position in which at least one of said surfaces of said valve element is in sealing engagement with said valve seat; and means for adjusting said adjustable element in a direction generally perpendicular to said central plane, when said valve element is in the closed position, wherein the adjusting means comprises means for moving said adjustable element in a direction perpendicular to the surface of said valve element which said valve seat engages.

11. A damper valve for controlling the flow of fluids through a conduit, comprising:

a base;

a valve element having opposed side surfaces, a periphery, and a central plane extending through the periphery;

an adjustable valve seat including a stationary member mounted on said base and an adjustable element mounted for movement relative to said stationary member, said adjustable element having a side facing said valve element and a side facing away from said valve element;

means for mounting said valve element for pivoting movement relative to said base, said valve element having a closed position in which at least one of said opposed side surfaces of said valve element is in sealing engagement with said stationary member of said valve seat and at least a portion of said adjustable element; and means for adjusting said adjustable element in a direction generally toward said central plane when said valve element is in the closed position.

12. The damper valve of claim 11, wherein, in the closed position of said valve element, the at least one side surface of said valve element is in sealing engagement with portions of said stationary member and out of sealing engagement with other portions of said stationary member, and said adjusting means comprises means for moving, in a direction generally perpendicular to said central plane, portions of said adjustable element overlying said other portions of said stationary element.

13. The damper valve of claim 11, wherein said adjustable valve seat has a length parallel to said at least one of said opposed side surfaces when said valve element is in the closed position, and said adjusting means comprises a plurality of adjusting devices spaced from one another in a direction parallel to the length of said adjustable valve seat.

14. The damper valve of claim 13, wherein said adjustment devices are independently adjustable.

15. The damper valve of claim 11, wherein said adjusting means comprises a base member, a threaded aperture associated with said base member, and a threaded element cooperating with said threaded aperture, said threaded element being engageable with said side of said seat valve facing away from said valve element.

16. The damper valve of claim 11, wherein said adjustable valve seat comprises two portions, diametrically opposed and positioned on opposite sides of said valve element from one another.

17. The damper valve of claim 11, wherein said base defines a flowpath through the conduit, and said adjusting means is mounted inside said flowpath.

* * * * *